(12) United States Patent
Wong

(10) Patent No.: US 6,439,851 B1
(45) Date of Patent: Aug. 27, 2002

(54) REDUCED STRESS ROTOR BLADE AND DISK ASSEMBLY

(75) Inventor: Charles K. Wong, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/746,255

(22) Filed: Dec. 21, 2000

(51) Int. Cl.$^7$ .................................................. F01D 5/30
(52) U.S. Cl. .................................. 416/219 R; 416/248
(58) Field of Search ............................ 416/248, 219 R, 416/220 R, 239

(56) References Cited

U.S. PATENT DOCUMENTS 5,259,728 A * 11/1993 Szpunar et al. ............... 416/2
6,065,938 A * 5/2000 Bartsch ................... 416/219 R

* cited by examiner

Primary Examiner—Edward K. Look
Assistant Examiner—Dwayne J. White (57) ABSTRACT

A bladed rotor disk assembly includes a plurality of circumferentially spaced apart blade root slots extending through the disk at an angle to the disk axial direction. Each slot has a radially inwardly facing load reaction surface along each side thereof extending continuously over less than the full the length of the slot in contact with a corresponding radially outwardly facing load reaction surface of a blade root disposed within the slot. This eliminates highly concentrated reaction loads adjacent the ends of the slot and results in a more uniform load distribution over the remaining smaller reaction surface area, reducing maximum stresses.

9 Claims, 7 Drawing Sheets

REAR  FRONT

FIG.10

REDUCED STRESS ROTOR BLADE AND DISK ASSEMBLY

BACKGROUND OF THE INVENTION

1. Technical Field

This invention relates to bladed rotor assemblies, and especially to bladed rotor assemblies for gas turbine engines.

2. Background Information

Bladed rotor assemblies are well known in the art, such as for compressors and turbines of gas turbine engines. In such assemblies, each blade is often attached to the rotor disk by means of a root, integral with the radially innermost end of the blade. The root fits closely within a corresponding blade root slot extending generally axially through the disk rim, but at an angle to the true direction of the disk axis. The disk material disposed circumferentially between a pair of adjacent slots is often referred to as a disk lug. The blade root includes radially outwardly facing reaction surfaces that engage corresponding radially inwardly facing reaction surfaces of a blade root slot. During operation of the rotor, the blade loads are transferred into the disk and disk lugs through these engaged surfaces. Typically, a blade root extends from the front face to the rear face of the disk; and the engaged load reaction surfaces also extend from the front to the rear face of the disk (i.e. the full length of the slot). This is true of bladed disks having conventionally designed dovetail shaped roots and slots, as well as fir tree shaped roots and slots.

It is generally desired to keep stresses within the disk and within the blades as low as possible to extend part life. In gas turbine engines designed for flight, it is also desired to minimize the weight of parts, such as disks and blades, consistent with efficient operation, long life and safety. Lighter weight blades also generate lower centrifugal forces and thus may reduce stresses within the disk.

BRIEF SUMMARY OF THE INVENTION

In accordance with the present invention, a bladed rotor disk assembly includes a plurality of circumferentially spaced apart blade root slots extending through the disk at an angle to the disk axial direction and having radially inwardly facing load reaction surfaces extending continuously over less than the full the length of the slot in contact with a corresponding radially outwardly facing load reaction surface of a blade root disposed within the slot.

By "load reaction surface", it is meant the surfaces of the blade root and blade root slot that, during operation of the rotor, contact or engage each other to transfer the loads from the blade into the disk. When in contact these surfaces form a "load transfer interface".

More specifically, the present invention eliminates what in the prior art would be portions of the load transfer interface adjacent the ends of the blade root slot, such that the loads over the remaining load transfer interface result in one or more of the following: a more symmetrical load distribution resulting in reduced torque loads on the disk lugs; reduced total loads on the disk lugs and blade roots; and, reduced maximum stress levels in the disk lugs and blade roots.

One reason these benefits may occur is because, with conventional root and slot designs, when the blade root load reaction surface along a side of a blade root extends the full length of the slot, the highest and most concentrated reaction loads on that side of the slot occur adjacent one end of the slot, while relatively lower and less concentrated (i.e. more uniform) reaction loads on that same side of the slot occur adjacent the other end of the slot. Therefore, at the low, more uniform reaction load end of the slot, the disk lug material is carrying a relatively small portion of the blade load per square inch of load transfer interface, while at the high reaction load end the disk lug material is carrying a much larger portion of the blade load per square inch of load transfer interface. By eliminating load transfer interface area at the low load end of each side of a slot, the reaction loads over the remaining load transfer interface on each side of the slot becomes more balanced, and results in lower maximum stress.

In one embodiment of the present invention a small area of each side of a slot adjacent an end of the slot and which faces what would normally be the low load portion of the root reaction surface is instead spaced from that low load portion such that there is a gap between the blade root and slot over that area. In all other respects, the blade and disk assembly may be considered conventional. The reaction loads over the now smaller load transfer interfaces on each side of the blade root are more balanced than without the gaps, and the maximum stress in the disk lugs is reduced.

In another embodiment of the present invention, end portions of the conventional blade root that normally transfer relatively low loads into the disk lugs are removed, providing the benefit of reduced blade weight in addition to more balanced reaction loads over the remaining length of a smaller load transfer interface on each side of the blade root. Total reaction loads, stresses and/or torque on the disk lugs may thereby be reduced. Reduced torque loads means less twisting of the blade lugs, with correspondingly less twisting of the blades.

The foregoing features and advantages of the present invention will become more apparent in light of the following detailed description of exemplary embodiments thereof as illustrated in the accompanying drawings.

DETAILED DESCRIPTION OF THE INVENTION

Figure 1:
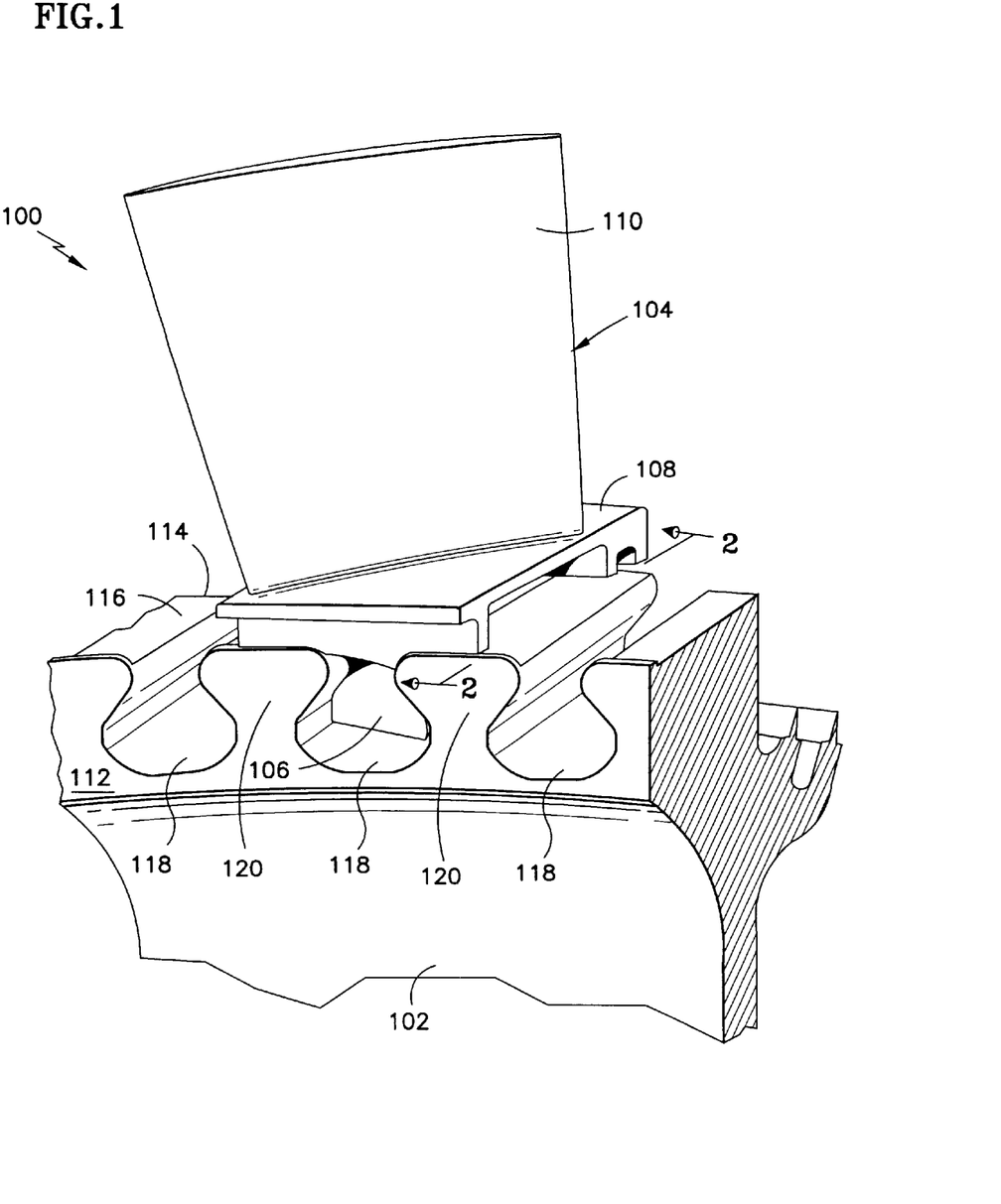
FIG. 1 is an isometric rear view of a portion of a rotor assembly according to one embodiment of the present invention, with some of the blades removed to better show the blade root slots through the rim of the rotor disk.
Figure 2:
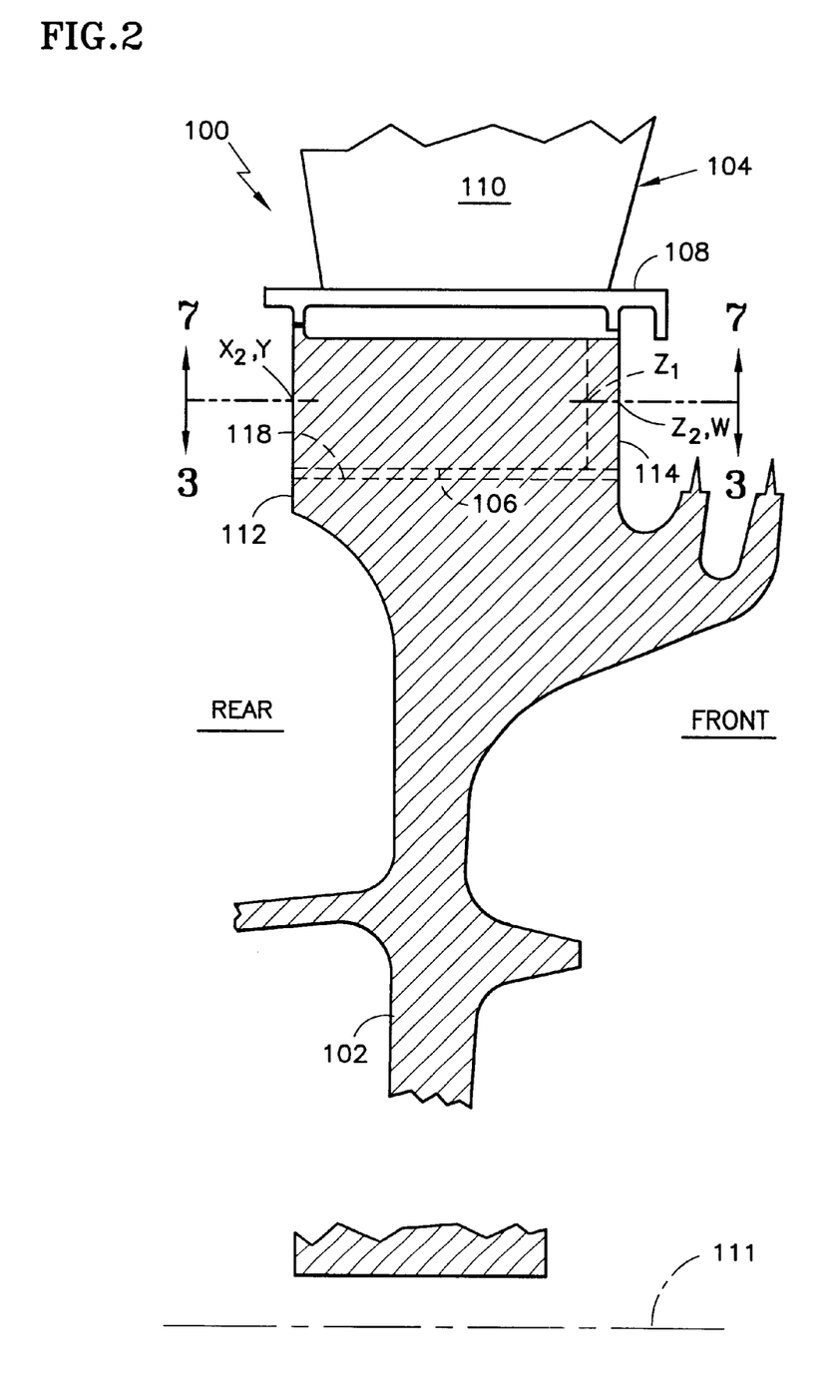
FIG. 2 is a sectional view taken along the line 2—2 of FIG. 1 through one of the rotor disk lugs, with the rotor disk axis being in the plane of the figure.
Figure 3:
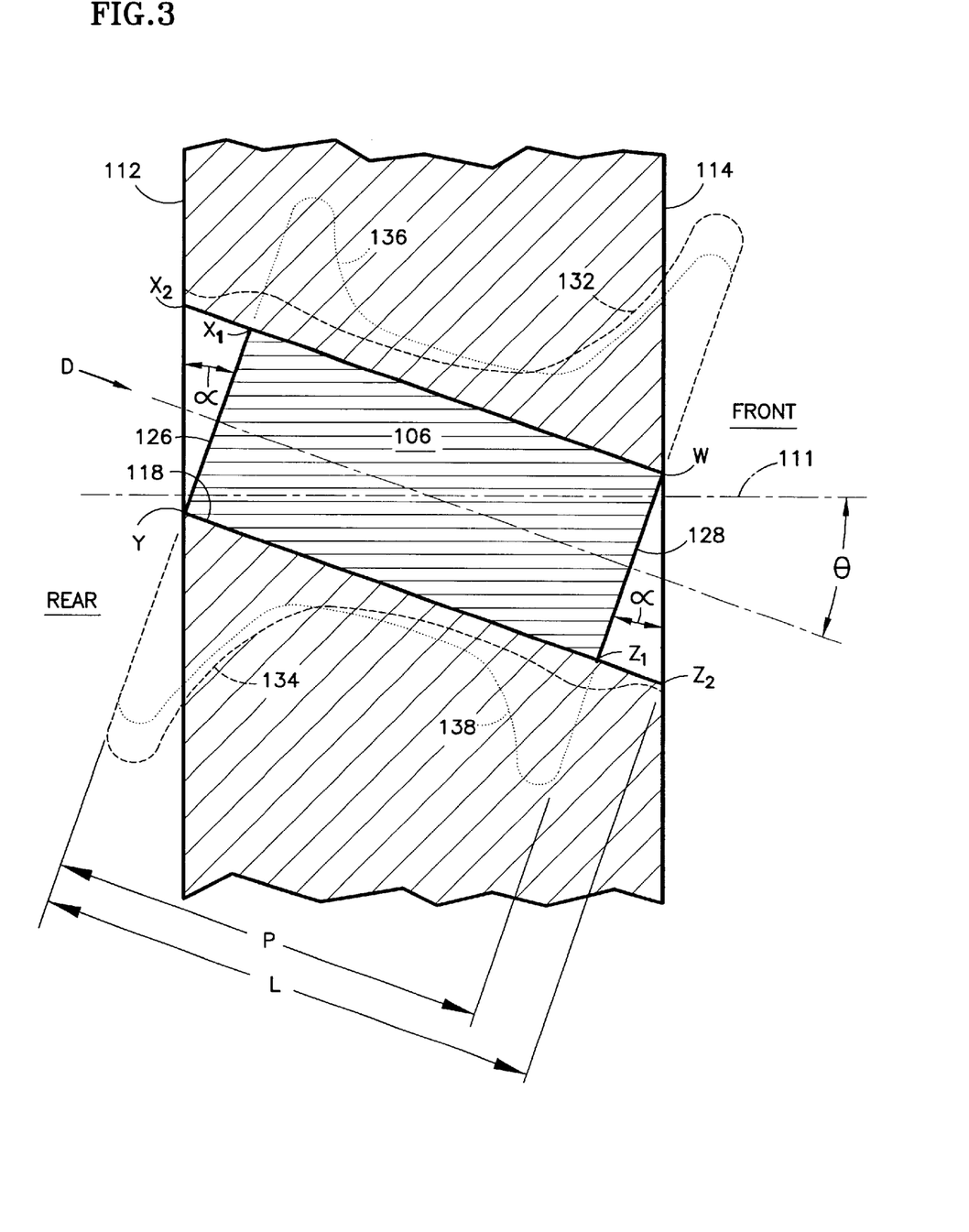
FIG. 3 is a diagrammatic sectional view, taken along the line 3—3 of FIG. 2, illustrating the differences in reaction loads along the length of the slot as between a disk assembly of the prior art and a disk assembly according to one embodiment of the present invention.

Referring to FIGS. 1 and 2, a gas turbine engine rotor assembly 100 incorporating an exemplary embodiment of the present invention includes a rotor disk 102 and a plurality of rotor blades 104, only one of which is shown. Each blade comprises a root 106, platform 108, and airfoil 110. The disk 102 has a rotational axis 111, a rear face 112, a front face 114, and a rim 116. A plurality of blade root slots 118 extends through the rim from the rear face to the front face in a direction D (FIG. 3). Each pair of adjacent slots defines a disk lug 120 therebetween. The root 106 of each blade is disposed within a respective one of the slots.

Figure 4:
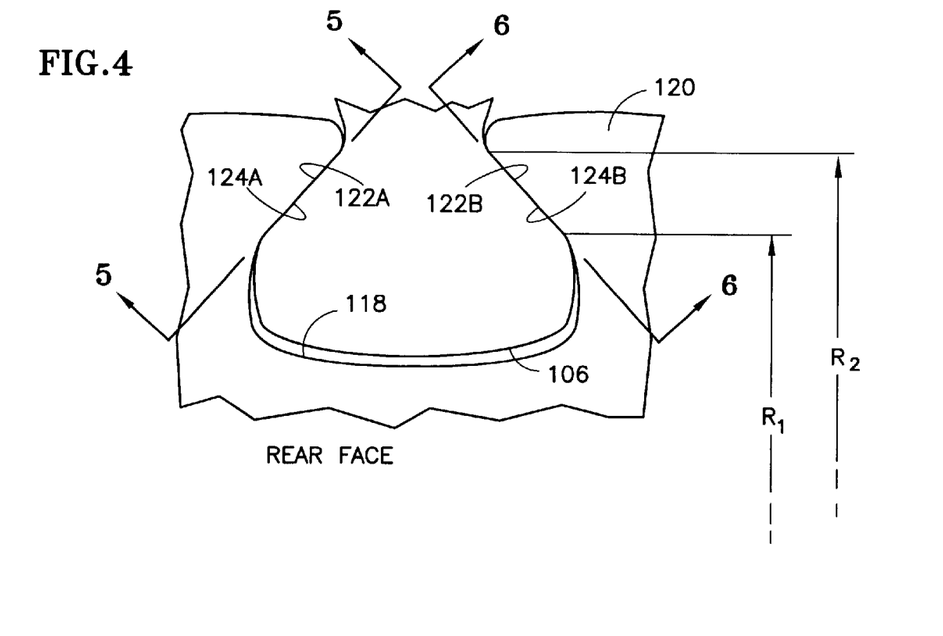
FIG. 4 is a view in the direction D of FIG. 3, parallel to the blade root slot length.

Referring to FIG. 3, each slot 118 extends in the direction D at an acute angle $\theta$ to the direction of the disk axis 111. Generally, this angle is between about 10° and 30°. In this example $\theta$ is 24° and, as best shown in FIG. 4, the blade roots 106 are of the well known "dovetail" shape, although the invention is not limited to use with blades having dovetail roots. The root of each blade has a pair of flat, radially outwardly facing load reaction surfaces 122A, 122B, one extending along each side of the root. The surfaces 122A, 122B abut corresponding flat, radially inwardly facing slot load reaction surfaces 124A, 124B, respectively. The interfaces formed by each of these pairs of contacting surfaces are hereinafter referred to as load transfer interfaces since, during operation of the rotor, the blade loads are transferred into the disk lugs across these interfaces.

Figure 5:
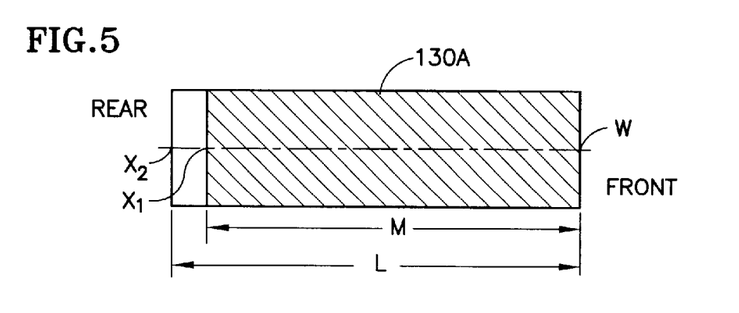
FIGS. 5 and 6 are schematic views in the directions 5—5 and 6—6, respectively, of FIG. 4 showing, for the embodiment of FIG. 1, the disk/blade load transfer interfaces along opposite sides of a blade root slot.
Figure 6:
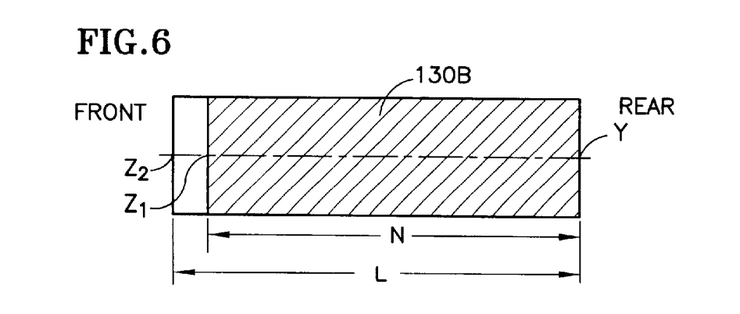
Figure 7:
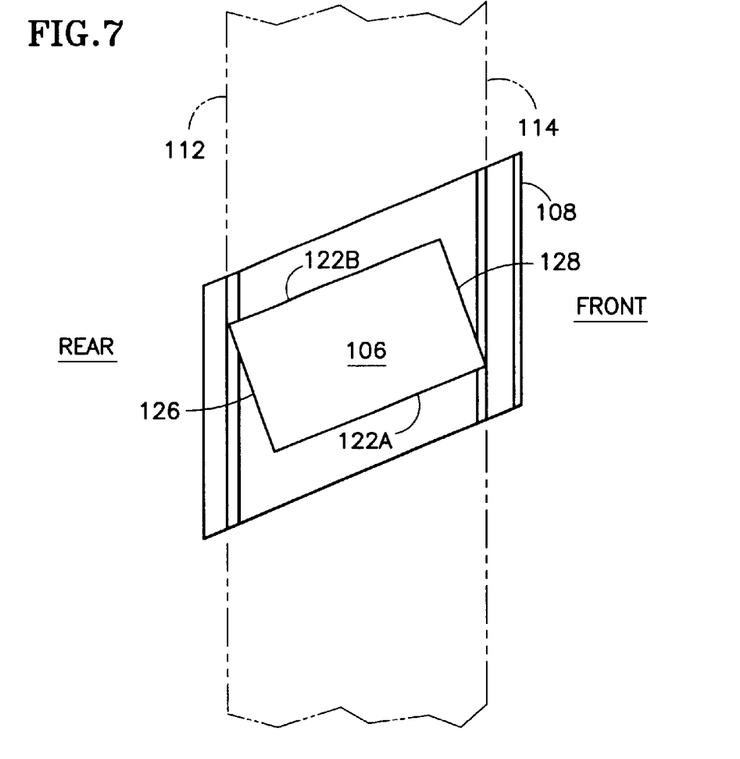
FIG. 7 is a schematic view, taken in the direction 7—7 of FIG. 2, showing, for the embodiment of FIG. 1, the cross-sectional shape of the blade root and its general orientation relative to the front and rear disk surfaces and the blade platform.

In the prior art, blade roots and disk slots, as well as the load transfer interfaces, are the same length, which is generally the full length, L (FIG. 3), of the slot, as measured in the direction D of the slot. In accordance with the present invention, at least one of the blade root load reaction surfaces 122A, 122B, and preferably both, is less than the slot length. This is best seen in FIG. 3, wherein the blade root 106, although fully within the slot 118, has oppositely facing end surfaces 126, 128 which are perpendicular to the slot direction D. Thus, as best shown in FIGS. 5 and 6, the cross-hatched load transfer interfaces 130A, 130B, have respective lengths M and N, corresponding to the respective lengths of the blade root load reaction surfaces 122A, 122B. FIG. 7 provides a radially outwardly looking view of the blade 104, showing the orientation and position of the blade root 106 relative to the blade platform 108 and the disk front and rear faces 114, 112, respectively.

Reference is also made to FIGS. 3, 5 and 6 for an understanding of the benefits of the present invention as compared to the prior art. In the present invention, the root load reaction surfaces 122A, 122B contact the slot load reaction surfaces 124A, 124B between the points Y and $Z_1$, and W and $X_1$, respectively. Assume, for purposes of discussion, that the blade root load reaction surfaces and slot load reaction surfaces extend the full length of the slot, such that over the radial extent (i.e. from $R_1$ to $R_2$ in FIG. 4) of the root load reaction surfaces the root end surfaces 126, 128 are substantially in the planes of the disk rear and front faces 112, 114, respectively, as is generally the case with prior art rotor assemblies (i.e. the angle $\alpha$ is 0°, rather than being equal to $\theta$, as shown in FIG. 3). In that case, blade loads would be transferred into the disk lugs over the full length L of the slot from $X_2$ to W on one side of the slot and from $Z_2$ to Y on the other side. The magnitude of the reaction loads for such a prior art configuration along the lengths L of the respective blade root slot reaction surfaces are represented by the curves 132, 134, which were generated by a computer model of such a configuration. The curves 136, 138 of FIG. 3 are generated by a computer model of the same rotor assembly modified according to the present invention (i.e. generally as shown in FIG. 1), and represent the magnitude of the reaction loads along the full lengths M (from $X_1$ to W) and N (from $Z_1$ to Y) of the blade root load reaction surfaces 122A, 122B, respectively. The perpendicular distance from the curves 132, 136 to the line $X_2$-W, and the perpendicular distance from the curves 134, 138 to the line $Z_2$-Y represent the magnitude of the reaction load.

Compare the "prior art" curves 132, 134 to the curves 136, 138 for the present invention. Note that, in the prior art rotor assembly configuration, the magnitude of the load along the length of each side of the slot is high at one end of the slot and tapers off to relatively low at the other end. On the other hand, the curves show that, in the rotor assembly configuration of present invention, the loads are more balanced over the blade root length, with high loads near each blade root end, and relatively low loads between the ends. Additionally, the maximum reaction load on each side of the slot is lower in the rotor assembly of the present invention. Computer modeling also indicates that the maximum stress concentration in the disk lugs is lower for the rotor assembly of the present invention, as compared to the prior art.

In the foregoing embodiment, the benefits are primarily the result of lowering the weight of the blade by reducing the length of the blade root. That reduces the total load on the disk lugs and corresponding stress levels; and, by having a more balanced load over the length of the root, the stress concentrations are even further reduced. At first glance, it may appear that the reduced reaction load surface areas might negate these benefits; however, the loss of load reaction surface area is not particularly detrimental because the eliminated portions of the prior art reaction surfaces near the ends of the slots (the non-cross-hatched portions of FIGS. 5 and 6) were carrying only a relatively small portion of the total load per unit surface area, as compared to the average load per unit surface area over the full length of the slot.

Although in the foregoing embodiment the blade root end surfaces 126, 128 are perpendicular to the blade root load reaction surfaces 122A, 122B, this is not a requirement. It is preferred, however, that the blade root end surfaces be parallel to each other to maintain symmetry. Thus, a parallelogram cross-sectional shape (in the view of FIG. 3) with the blade root of any length less than the slot length L (in the direction D) may provide a benefit over the prior art by reducing blade weight. Preferably, the angle $\alpha$ is between 0° and $\theta$. Although the blade root end surfaces 126, 128 are preferably parallel, they need not be; and, thus, M does not need to equal N, although at least one of them must be less than L.

Figure 8:
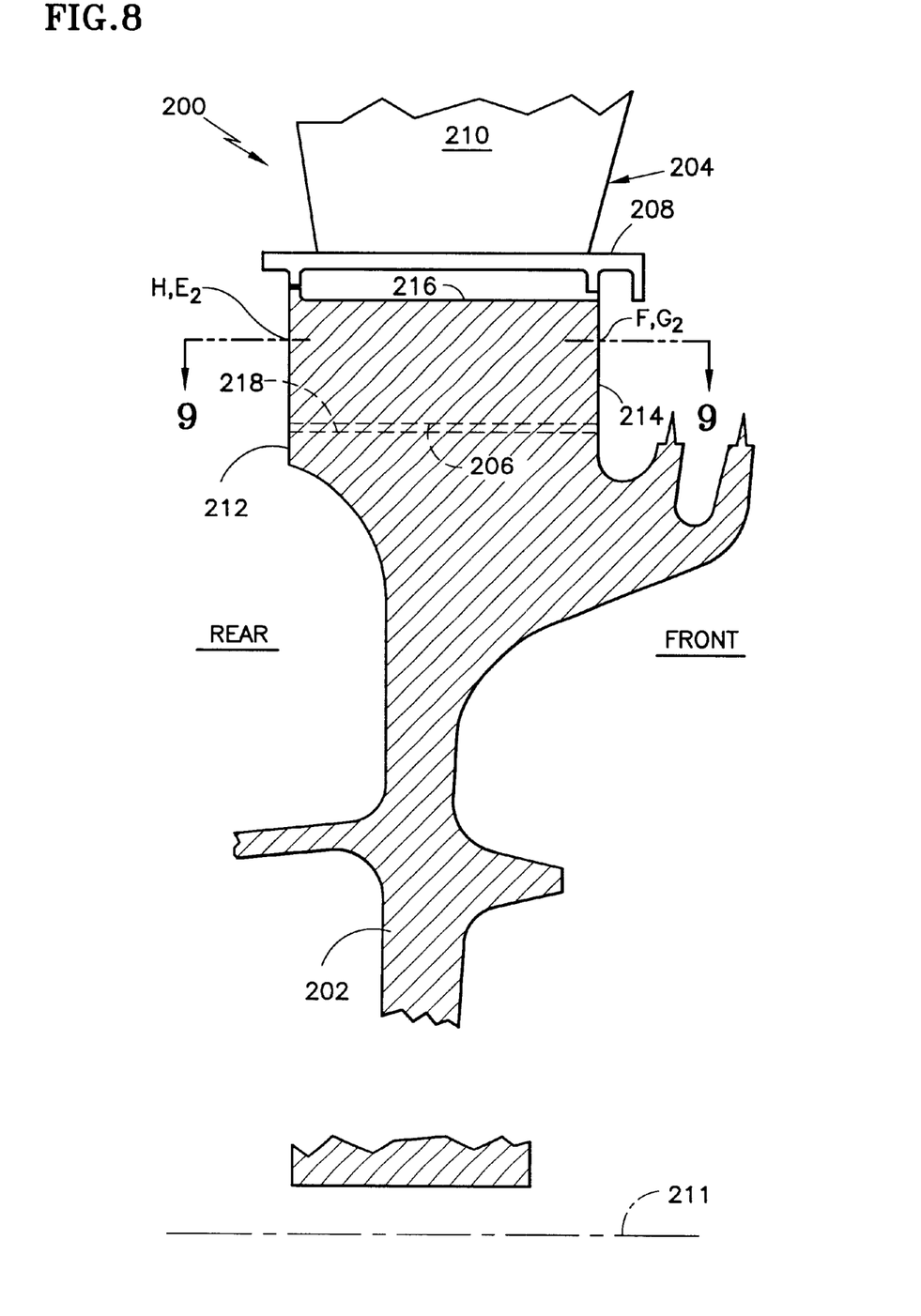
FIG. 8 is a sectional view of a rotor assembly, like the sectional view of FIG. 2, but showing a rotor assembly incorporating an alternate embodiment of the present invention.
Figure 9:
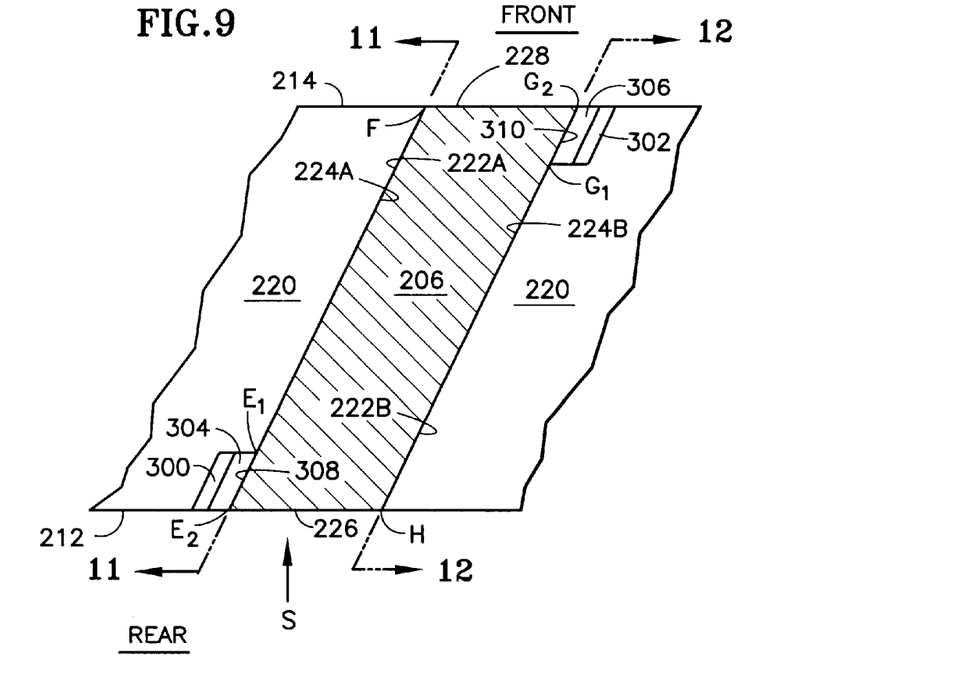
FIG. 9 is a simplified sectional view taken along the line 9—9 of FIG. 8.
Figure 10:
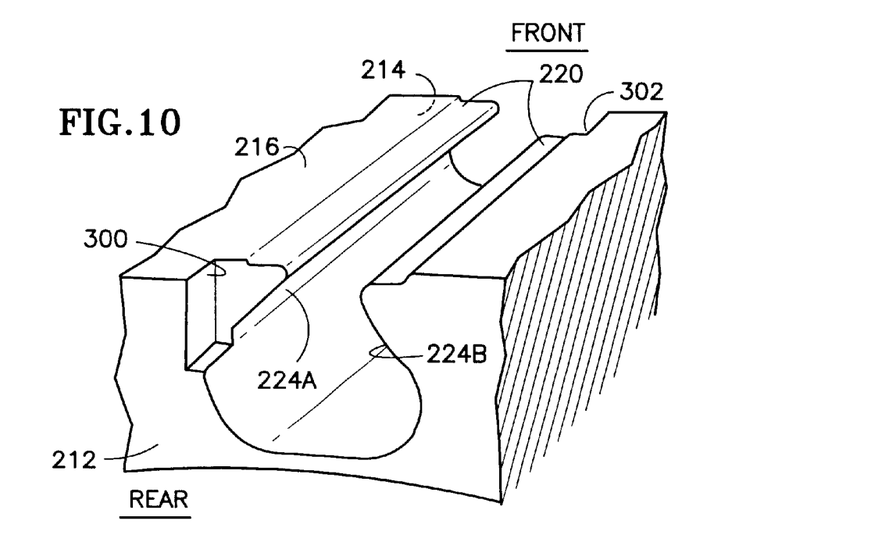
FIG. 10 is an isometric view in the direction S of FIG. 9 perpendicular to the rear face of the disk, with the blade removed.

In accordance with another embodiment of the present invention, reference is made to FIGS. 8, 9 and 10. The rotor assembly 200 includes a disk 202 and blades 204, only one of which is shown. The disk axis is designated by the reference numeral 211. The disk has front and rear parallel opposed faces 214, 212 adjacent its rim 216. The disk also has a plurality of circumferentially spaced apart blade root slots 218 defined by and between disk lugs 220, and extending through the disk rim from the front face 212 to the rear face 214. As in the previous embodiment, the slots 218 are cut at an angle to the disk axis 211. Each blade 204 comprises a dovetail-shaped root 206, platform 208, and airfoil 210. In this embodiment, as is also the case in rotor assemblies of the prior art, the blade roots extend the full length of their respective slots, whereby the root end surfaces 226, 228 are substantially flush with respective end faces 212, 214 of the disk, at least over the radial extent of the root load reaction surfaces.

In accordance with this embodiment of the invention, the lugs 220 on each side of a blade root 206 each have pockets 300, 302 cut into opposite end faces 212, 214 of the disk at the rim to cut back or remove material that would otherwise form a portion of a slot load reaction surface that engages a blade root load reaction surface. Thus, as shown in FIG. 9, wherein the cross-section through the blade root is shown crosshatched, the root load reaction surface 222A and the slot load reaction surface 224A both extend from E1 to F. Similarly, the corresponding reaction surfaces 222B and 224B on the other side of the slot extend from G1 to H. Essentially, the pockets 300, 302 create gaps 304, 306 between each lug 220 and what are hereinafter referred to as extensions 308 (having a length from $E_1$ to $E_2$) and 310 (having a length from $G_1$ to $G_2$) of the blade root load reaction surfaces 222A, 222B, respectively.

Figure 11:
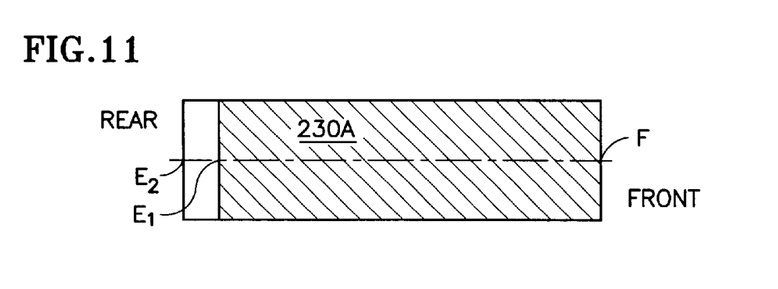
FIGS. 11 and 12 are schematic views in the directions 11—11 and 12—12, respectively, of FIG. 4 showing, for the embodiment of FIG. 8, the disk/blade load transfer interfaces along opposite sides of a blade root slot.
Figure 12:
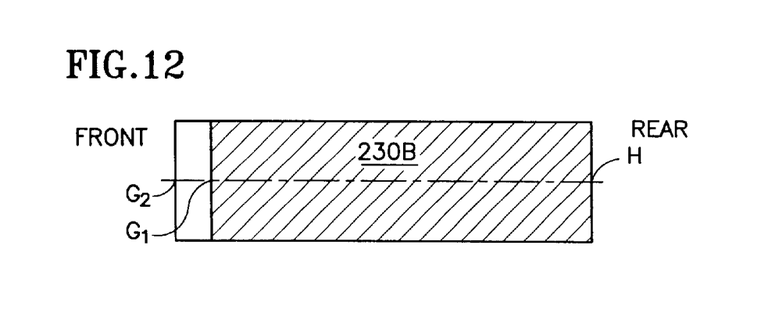

FIGS. 11 and 12 are analogous to FIGS. 5 and 6 of the previously described embodiment, and show the load transfer interfaces 230A, 230B, on each side of a slot in the embodiment of FIG. 8. L, M, and N represent the same lengths as in FIGS. 5 and 6. It is readily seen that both embodiments can result in the very same load transfer interfaces. The FIG. 1 embodiment accomplishes this by effectively shortening the length of the blade root; and the FIG. 8 embodiment does this by removing material from the slot surface to create a gap between a portion of the lug and the blade root. In each case the "removed" portion of the prior art load transfer interface was previously located where the prior art reaction loads were relatively low. Moreover, in both embodiments the loads transferred along the length of the load transfer interface are more balanced than those of the prior art, resulting in lower maximum stresses in the lugs. Thus, the general shape of the curves 136, 138 in FIG. 3 would be the same for the embodiment of FIG. 8; however, the embodiment of FIG. 1 has the additional advantage of reduced blade weight and correspondingly lower total blade loads to be transferred into the lugs.

Although the invention has been described and illustrated with respect to exemplary embodiments thereof, it should be understood by those skilled in the art that the foregoing and various other changes, omissions and additions may be made without departing from the spirit and scope of the invention. For example, gaps similar to the gaps 304, 306 between the blade root and slot may be formed by removing a small amount of material from the blade root load reaction surfaces rather than from the disk lugs.

What is claimed is:

1. A rotor assembly comprising:
   a disk having a rotational axis, opposing front and rear surfaces, a rim, and a plurality of circumferentially spaced apart blade retaining slots extending through said rim from said front disk surface through said rear disk surface in a direction D which forms an angle θ of at least 10° with said disk axis, each pair of adjacent slots defining a disk lug therebetween, each of said slots having a first radially inwardly facing slot load reaction surface of length M extending from said front disk surface in said direction D on a first of said lugs, and a second radially inwardly facing slot load reaction surface of length N extending from said rear disk surface in said direction D on a second of said lugs adjacent said first lug, each of said slots having a length L from said disk front surface to said disk rear surface in said direction D; and
   a plurality of blades, each having an airfoil and a root integral with said airfoil, said root disposed within a respective one of said slots, said root having a radially outwardly facing first root load reaction surface of length M extending in said direction D forming a load transfer interface of length M with said first slot load reaction surface and a radially outwardly facing second root load reaction surface of length N extending in said direction D forming a load transfer interface of length N with said second slot load reaction surface, wherein said slot length L is greater than at least one of said lengths M and N.

2. The rotor assembly according to claim 1, wherein M equals N.

3. The rotor assembly according to claim 1, wherein the slot length L is greater than both M and N.

4. The rotor assembly according to claim 1, wherein said blade root has oppositely facing end surfaces perpendicular to said direction D.

5. The rotor assembly according to claim 1, wherein said root is a dovetail root.

6. A rotor assembly comprising:
   a disk having a rotational axis, opposing front and rear surfaces, a rim, and a plurality of circumferentially spaced apart blade retaining slots extending through said rim from said front disk surface through said rear disk surface in a direction D which forms an angle θ of at least 10° with said disk axis, each pair of adjacent slots defining a disk lug therebetween, each of said slots having a first radially inwardly facing slot load reaction surface extending from said front disk surface in said direction D a distance M on a first of said lugs, and a second radially inwardly facing slot load reaction surface extending from said rear disk surface in said direction D a distance N on a second of said lugs adjacent said first lug, each of said slots having a length L from said disk front surface to said disk rear surface in said direction D; and
   a plurality of blades, each having an airfoil and a root integral with said airfoil, said root disposed within a respective one of said slots, said root having a radially outwardly facing first root load reaction surface extending in said direction D a distance M and a radially outwardly facing second root load reaction surface extending in said direction D a distance N, said first root load reaction surface adapted to contact said first slot load reaction surface over said distance M, and said second root load reaction surface adapted to contact said second slot load reaction surface over said distance N, wherein said slot length L is greater than at least one of said distances M and N, wherein at least one of said blade root end surfaces is substantially in the plane of one of said opposing disk front and rear surfaces over the radial extent of said root reaction surfaces, and wherein at least one of said root load reaction surfaces includes an extension, in the direction D, to said at least one of said root end surfaces, said slot being spaced from said load reaction surface extension leaving a gap therebetween.

7. A rotor assembly comprising:

a disk having a rotational axis, opposing front and rear surfaces, a rim, and a plurality of circumferentially spaced apart blade retaining slots extending through said rim from said front disk surface through said rear disk surface in a direction D which forms an angle θ of at least 10° with said disk axis, each pair of adjacent slots defining a disk lug therebetween, each of said slots having a first radially inwardly facing slot load reaction surface extending from said front disk surface in said direction D a distance M on a first of said lugs, and a second radially inwardly facing slot load reaction surface extending from said rear disk surface in said direction D a distance N on a second of said lugs adjacent said first lug, each of said slots having a length L from said disk front surface to said disk rear surface in said direction D; and a plurality of blades, each having an airfoil and a root integral with said airfoil, said root disposed within a respective one of said slots, said root having a radially outwardly facing first root load reaction surface extending in said direction D a distance M and a radially outwardly facing second root load reaction surface extending in said direction D a distance N, said first root load reaction surface adapted to contact said first slot load reaction surface over said distance M, and said second root load reaction surface adapted to contact said second slot load reaction surface over said distance N, wherein said slot length L is greater than at least one of said distances M and N, wherein one of said blade root end surfaces is substantially in the plane of said disk front surface over the radial extent of said root load reaction surfaces, and the other one of said blade root end surfaces is substantially in the plane of said disk rear surface over the radial extent of said root load reaction surfaces, and wherein each of said root load reaction surfaces includes an extension, in the direction D, to a respective one of said root end surfaces, said slot being spaced from each of said load reaction surface extensions leaving gaps therebetween.

8. The rotor assembly according to claim 7, wherein M and N are equal.

9. The rotor assembly according to claim 7, wherein said root is a dovetail root.

* * * * *